(12) United States Patent
Mahakul et al.

(10) Patent No.: US 8,474,258 B2
(45) Date of Patent: Jul. 2, 2013

(54) STOICHIOMETRIC COMPRESSION IGNITION ENGINE WITH INCREASED POWER OUTPUT

(75) Inventors: Budhadeb Mahakul, Naperville, IL (US); Richard E. Winsor, Waterloo, IA (US)

(73) Assignee: Deere & Company, Moline, IL (US)

( * ) Notice: Subject to any disclaimer, the term of this patent is extended or adjusted under 35 U.S.C. 154(b) by 1171 days.

(21) Appl. No.: 12/236,863

(22) Filed: Sep. 24, 2008

(65) Prior Publication Data

US 2010/0071364 A1   Mar. 25, 2010

(51) Int. Cl.
*F02B 33/44*   (2006.01)
*F02G 3/00*   (2006.01)
*F02M 25/07*   (2006.01)
*F02B 41/10*   (2006.01)

(52) U.S. Cl.
USPC ............... 60/605.2; 60/614; 60/624; 701/108

(58) Field of Classification Search
USPC ............. 60/605.2, 614, 624, 605.1, 601, 612; 701/108
IPC ...................................................... F02M 25/07
See application file for complete search history.

(56) References Cited

U.S. PATENT DOCUMENTS

| | | | | |
|---|---|---|---|---|
| 4,748,812 A | * | 6/1988 | Okada et al. | 60/614 |
| 4,760,702 A | * | 8/1988 | Ammann et al. | 60/605.1 |
| 4,884,407 A | * | 12/1989 | Hatanaka | 60/614 |
| 5,119,633 A | * | 6/1992 | Brooks et al. | 60/624 |
| 5,142,868 A | * | 9/1992 | Woon et al. | 60/624 |
| 5,884,482 A | * | 3/1999 | Lange et al. | 60/624 |
| 6,155,050 A | * | 12/2000 | Blanz et al. | 60/603 |
| 6,273,076 B1 | * | 8/2001 | Beck et al. | 60/612 |
| 6,354,268 B1 | * | 3/2002 | Beck et al. | 60/601 |
| 6,422,004 B1 | | 7/2002 | Takami et al. | |
| 6,435,166 B1 | * | 8/2002 | Sato et al. | 123/568.12 |
| 6,539,716 B2 | * | 4/2003 | Finger et al. | 60/605.2 |
| 6,698,185 B2 | | 3/2004 | Kitahara | |
| 6,922,988 B2 | | 8/2005 | Yamaguchi et al. | |
| 6,945,236 B2 | * | 9/2005 | Nakai et al. | 123/568.12 |
| 7,143,756 B2 | | 12/2006 | Kojima et al. | |
| 7,178,327 B2 | | 2/2007 | Miyashita | |
| 7,181,906 B2 | | 2/2007 | Dalla Betta et al. | |
| 7,251,932 B2 | | 8/2007 | Huang | |
| 7,943,014 B2 | * | 5/2011 | Berruti et al. | 202/108 |
| 2001/0035171 A1 | * | 11/2001 | Kim et al. | 123/568.12 |
| 2002/0002969 A1 | * | 1/2002 | Adler et al. | 123/676 |
| 2002/0054843 A1 | * | 5/2002 | Maunula | 423/213.5 |
| 2002/0141921 A1 | * | 10/2002 | Wu et al. | 423/239.1 |
| 2002/0182134 A1 | * | 12/2002 | Wu et al. | 423/239.1 |
| 2003/0084876 A1 | * | 5/2003 | Stanglmaier | 123/431 |
| 2004/0055298 A1 | * | 3/2004 | Fischer et al. | 60/606 |

(Continued)

*Primary Examiner* — Thai Ba Trieu

(57) ABSTRACT

A stoichiometric compression ignition engine has a turbocharger coupled to it so that the exhaust from the engine feeds the turbine and the compressor provides combustion air past a throttle and intercooler to the engine intake manifold. An exhaust after treatment device is positioned before the exhaust of the engine. A power turbine is connected in parallel relation to the turbocharger turbine and is controlled by a valve to operate the power turbine whenever either the turbocharger compressor boost or the turbocharger turbine back pressure exceed given limits. The power turbine is connected by a power transmission device to either couple to the engine output or to an electrical generator. An EGR loop may be driven by a pump also connected to the power turbine to lower in cylinder pressures.

33 Claims, 1 Drawing Sheet

U.S. PATENT DOCUMENTS

| | | |
|---|---|---|
| 2004/0083715 A1* | 5/2004 | Le Leux et al. ............... 60/280 |
| 2005/0188680 A1* | 9/2005 | Ueda et al. ................. 60/277 |
| 2006/0207822 A1* | 9/2006 | Taylor ....................... 180/326 |
| 2002/7003932 | 2/2007 | Sheidler et al. |
| 2007/0227120 A1 | 10/2007 | Yodice et al. |
| 2007/0256405 A1 | 11/2007 | Gabe et al. |
| 2008/0190097 A1* | 8/2008 | Wada et al. ................. 60/287 |
| 2008/0307788 A1* | 12/2008 | Hokuto ....................... 60/624 |

\* cited by examiner

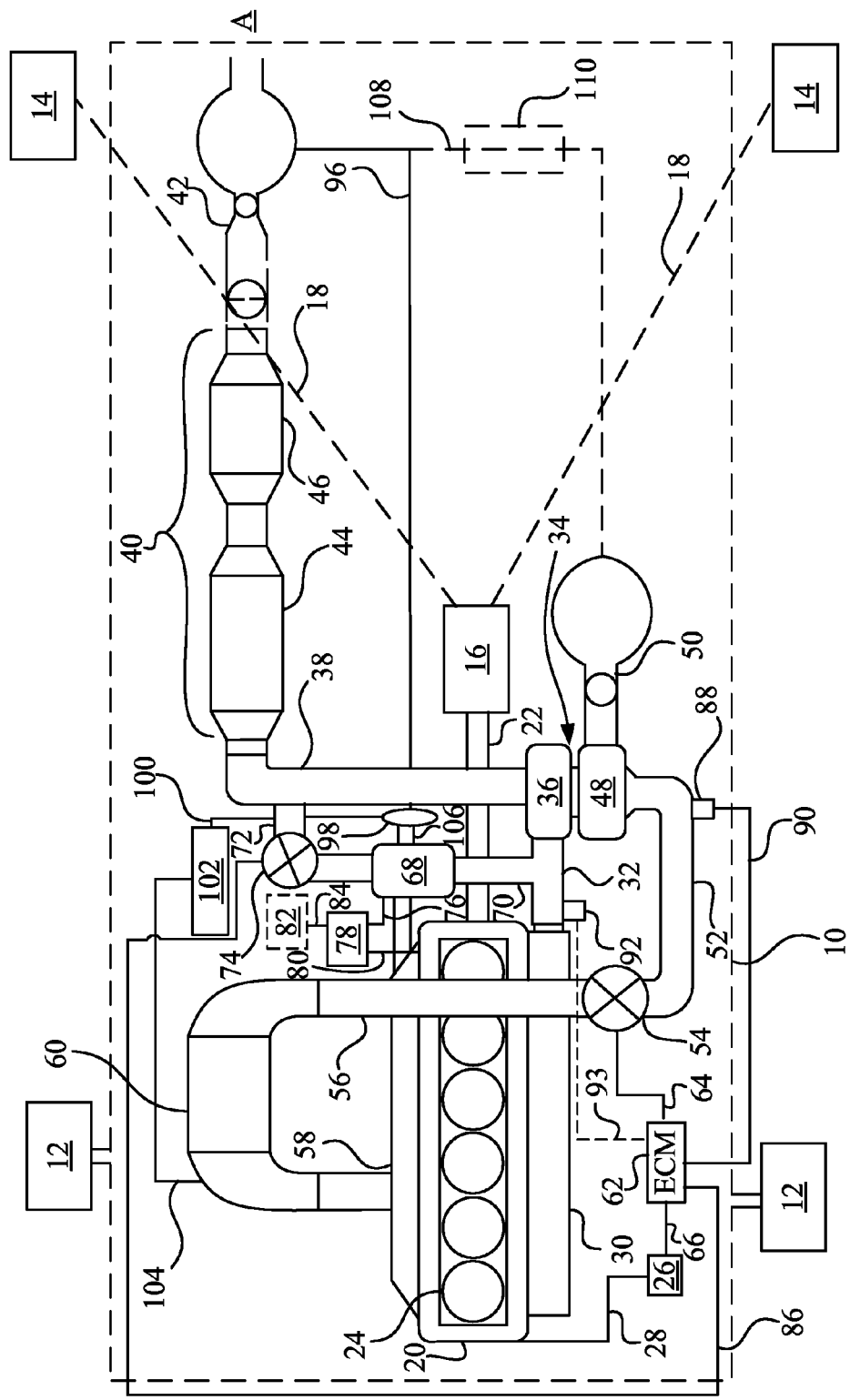

STOICHIOMETRIC COMPRESSION IGNITION ENGINE WITH INCREASED POWER OUTPUT

FIELD OF THE INVENTION

The invention relates to internal combustion engines and, more specifically, to compression ignition engines operating under stoichiometric conditions.

BACKGROUND OF THE INVENTION

For over 100 years, the compression ignition or diesel engine has been a mainstay of propulsion with work machines owing to its exceptional fuel economy, high torque output, and long term durability. The engine that has served so well for so long, has limitations placed on its power output because of ever increasing EPA limitations on engine emissions that have first been applied to on highway vehicles and are now being applied to work machines of the industrial, agricultural, and forestry type.

The initial responses to emission limitations have been achieved by in-cylinder manipulation of the combustion process but with ever decreasing limits there is an increasing difficulty of reducing particulates and NOx emissions. One of the more promising approaches to achieving these goals in a cost effective way is with the use of stoichiometric compression ignition (SCI) engines. This is a compression ignition engine that is operated under stoichiometric conditions without the excess air that is typically found in a diesel engine. Stoichiometric operation is a combustion process where all of the available oxygen is consumed by all of the available fuel and results in no extra oxygen. The advantage of this system is the ability to control NOx emissions with the use of well proven automotive three-way catalysts. Since these engines operate under stoichiometric conditions, there is no excess air available to absorb combustion temperatures. This can result in in-cylinder and exhaust system components being exposed to conditions beyond their normal thermal limits. As a result, the thermal limitation requires that the available temperatures be reduced and, as a consequence, the power output is limited.

Accordingly, what is needed in the art is a stoichiometric compression ignition system that utilizes more of the available energy in the combustion process.

SUMMARY OF THE INVENTION

In one form, the invention is an internal combustion power system including an air breathing, fuel consuming, reciprocating internal combustion (IC) engine operating at near stoichiometric fuel/air conditions and producing products of combustion with an excess of energy to produce a power output. A turbocharger turbine receives products of combustion from the IC engine and a compressor is driven by the turbocharger turbine for supplying pressurized air to an inlet of the IC engine. A power turbine is connected in parallel with the turbocharger turbine to also receive products of combustion from the IC engine, the power turbine being connected to at least the power output of the IC engine. A valve is provided to selectively permit passage of products of combustion across the power turbine when a preselected level of one of boost pressure from the turbocharger compressor and back pressure upstream of the turbocharger turbine is exceeded.

In another form, the invention is a work machine having a frame, a plurality of wheels mounted on the frame, and a transmission mounted on the frame for driving at least two of the wheels. An air breathing, fuel consuming, reciprocating internal combustion (IC) engine is mounted in the frame and operates at near stoichiometric fuel/air conditions and produces products of combustion with an excess of energy to produce a power output at least connected to the transmission. A turbocharger having a turbine receives products of combustion from the IC engine and a compressor is driven by the turbocharger turbine for supplying pressurized air to an inlet of the IC engine. A power turbine is connected in parallel with the turbocharger turbine to also receive products of combustion from the IC engine, the power turbine being connected to at least the power output of the IC engine. A valve is operable to selectively permit passage of products of combustion across the power turbine when a preselected level of one of boost pressure from the turbocharger compressor and back pressure upstream of the turbocharger turbine is exceeded.

And still another form of the invention is the method of operating an air breathing, fuel consuming, internal combustion (IC) engine. The steps include operating the IC engine at near stoichiometric fuel/air conditions thus producing products of combustion with an excess of energy over that needed to produce a power output from the IC engine. A turbocharger turbine is driven with the products of combustion from the IC engine. A turbocharger compressor is driven by the turbocharger turbine for supplying pressurized air to the IC engine. A power turbine is selectively driven in parallel relation to the turbocharger turbine when a preselected level of one of boost pressure from the turbocharger compressor and back pressure upstream of the turbocharger turbine is exceeded to at least power to the power output of the IC engine.

SUMMARY OF THE DRAWINGS

FIG. 1 is a schematic illustration of a work machine incorporating a stoichiometric compression ignition engine embodying the present invention.

Referring to FIG. 1, a work machine 10 is represented by dashed lines and may be an industrial, agricultural, or forestry vehicle. In either vehicle, a prime mover operates provides power for movement of the vehicle over the ground and, in addition, powers various processing and accessory equipment. For example, for an industrial machine that may be earth moving blades and implements. In the case of agricultural machines, it would be cutting, gathering, and processing agricultural material. In the case of forestry machines, it would be cutting, grappling, and transporting trees. The vehicle 10 has front wheels 12 and rear wheels 14. While all four wheels may be powered, as illustrated, the rear wheels 14 are powered from a transmission 16 through mechanical connections represented by dashed line 18.

The transmission 16 receives its power from an internal combustion engine 20 through a drive shaft 22. Internal combustion engine 20 is of the compression engine type in which a plurality of cylinders 24 have reciprocating pistons (not shown) to achieve a cycle of intake, compression, expansion, and exhaust. The pistons are connected to a common crankshaft to convert the reciprocating movement to a rotary power output at shaft 22. The engine 20 operates on a compression ignition cycle in which intake air is compressed to the point where injection of fuel in timed and measured quantities from a fuel system 26 via lines 28 produces compression ignition for the combustion cycle. The products of combustion are exhausted through a valve system (not shown) to an exhaust manifold 30 which extends via a line 32 to a turbocharger 34 having a turbine 36. The turbocharger turbine 36 receives products of combustion through an inlet and discharges them through an outlet line 38 past an exhaust aftertreatment device 40, through an exhaust line 42, and finally to ambient A.

The exhaust after treatment device 40 may consist of a number of units for the illustrated engine system that consists of an upstream diesel particulate filter 44 and a down stream three way catalyst 46 of the type utilized in automotive applications. The exhaust after treatment device 40 may additionally include other elements as-needed to remove harmful particulates from the exhaust delivered to ambient A.

The turbocharger turbine 36 is connected to, and drives, a turbocharger compressor 48 which receives air from an intake 50 and pressurizes it through a line 52 past an intake throttle 54 and line 56 to intake manifold 58 supplying combustion air to the cylinders of engine 20. An intercooler or after-cooler, designated by number 60, may be interposed in line 56 to cool the intake air and increase the charge density for additional power output.

The movement of the throttle 54 and management of fuel from fuel system 26 are controlled by an electronic control module (ECM) 62 via lines 64 and 66 respectively. The ECM controls these elements with a control logic that produces a stoichiometric combustion process within the cylinders of engine 20. In other words, all of the fuel is consumed by all of the air in the combustion process so that there is no extra air discharged into the exhaust manifold. Because of temperature limitations, the variables of fuel and throttle must be adjusted to limit the temperatures within the combustion chambers. Although this enables an inexpensive three way automotive style catalyst 46 to treat the exhaust stream, it results in a significantly reduced capability of power output from the engine 20.

In accordance with the present invention, a power turbine 68 is provided in parallel connection relative to turbocharger turbine 36 and includes a branch line 70 connected to exhaust line 32 which is connected to the inlet of the power turbine 68. The line 72 leading from the exhaust of power turbine 68 connects with exhaust line 38 downstream of turbocharger turbine 36. A valve 74 is provided in line 72 to control the flow of exhaust gases through lines 70 and 72 which determines whether power turbine 68 will provide a power output. Power turbine 68 may be of the centrifugal type similar to the turbine in the turbocharger 34 or it may also be an axial flow turbine.

One output from the power turbine 68 is through a line connection 76 that extends to a power transmission device 78 connected to the output of engine 20 by connection 80 or alternatively to a generator 82 shown in dashed lines by a connection 84. A power transmission device 78 may typically be one that damps the torsional oscillations of the engine crankshaft to keep them from having a deleterious effect on the structural integrity of the rotating element in power turbine 68. In the case of power turbine 68 being exclusively connected to the generator 82, the torsional oscillation damping feature would not be necessary. The valve 74 may typically be controlled from the ECM via a line 86 extending between ECM and valve 74. The ECM receives an additional signal input from pressure sensor 88 via line 92 transmit the boost pressure of turbocharger compressor 48 to the ECM. Alternatively, the back pressure at the inlet to turbocharger turbine 36 as indicated by sensor 90 shown in dashed lines via line 92 may be used as the signal to trigger operation of valve 74 and therefore the extraction of energy by power turbine 68 from the products of combustion emanating from engine 20. The sensor 88 and alternatively sensor 92 indicate are set to open valve 74 when the boost pressure or back pressure exceed predetermined levels.

The reason for utilizing boost pressure as the trigger for opening the valve 74 is that, because the engine 20 operates on a stoichiometric air/fuel ratio, there is an excess of air so that because of a limited throughput so that the additional energy in the exhaust line 32 is passed over the power turbine 68 to be recouped as additional power. Examples of a boost pressure appropriate for triggering this opening are between 10 and 25 psig. Under lower power conditions, the power turbine 68 does not function, but when the power output is increased, it is brought into operation to provide additional power. This contributes to a significant recoupment of exhaust energy that would otherwise be lost in a diesel engine that operates on a stoichiometric air/fuel ratio. The extraction of energy via the power turbine 68 also lowers the downstream temperature so as to alleviate thermal stresses on the components of the exhaust system.

An additional way of lowering the in-cylinder and exhaust temperatures is with an EGR system that is connected to the outlet line 42 via line 96 which leads to an EGR pump 98 delivering an output to line 100 and cooler 102 and finally through line 104 to the intake 58 of engine 20. The EGR pump 98 is also connected to power turbine 68 by an appropriate connection 106. In this case, the pump 98 permits lower temperature exhaust gases because of the cooler 102. As a result, lower temperature gases enter into the intake manifold system downstream of intercooler 60 at a sufficient pressure that the in cylinder temperatures are decreased and resultant cylinder component temperature is decreased and subsequent exhaust system temperature is decreased. In addition, this circulation of EGR provides additional capacity to store energy released from the combustion process. Alternatively, a line 108 shown as a dashed line and cooler 110 also shown as a dashed line may be used to connect EGR to inlet 50 of the turbocharger compressor 48. In both cases, the EGR circulation enables a significant reduction in in cylinder and exhaust system component temperatures as well as providing a means to provide additional capacity to store energy released from the combustion process.

Having described the preferred embodiment, it will become apparent that various modifications can be made without departing from the scope of the invention as defined in the accompanying claims.

The invention claimed is:

1. A method of operating an air breathing, fuel consuming compression ignition internal combustion engine comprising the steps of:
   operating the reciprocating compression ignition engine at near stoichiometric fuel/air conditions, thus producing products of combustion with an excess of energy over that needed to produce a power output from the reciprocating compression ignition engine;
   driving a turbocharger turbine with said products of combustion from the reciprocating compression ignition engine;
   driving a turbocharger compressor with the turbocharger turbine for supplying pressurized air to the reciprocating compression ignition engine;
   selectively driving a power turbine in parallel relation to the turbocharger turbine when a preselected level of one of boost pressure from the turbocharger compressor and back pressure said products of combustion upstream of the turbocharger turbine is exceeded to at least add power to one of the power output of the reciprocating compression ignition engine and an auxiliary load device.

2. The method as claimed in claim 1 further comprising the steps of:
   providing a path for said products of combustion from a point downstream of the power turbine and turbocharger turbine to a point between the turbocharger compressor and the intake to the compression ignition engine, and;

utilizing the power turbine to direct said products of combustion through the passage.

3. The method as claimed in claim 2 further comprising the step of cooling the products of combustion passing to the inlet of the reciprocating compression ignition engine.

4. The method as claimed in claim 1 further comprising the step of cooling the air between the turbo compressor and the reciprocating compression ignition engine.

5. The method as claimed in claim 1 further comprising the step of selectively controlling the air passing to the intake of the reciprocating compression ignition engine by a throttle.

6. The method as claimed in claim 1 further comprising the step of treating the products of combustion downstream of the power turbine and turbocharger turbine.

7. The method as claimed in claim 6 wherein the steps of treating the products of combustion include filtering particulates from the products of combustion and in series relation passing the products of combustion over a three-way catalyst.

8. The method as claimed in claim 1 wherein the power turbine is selectively driven by a valve downstream of the power turbine and providing a variable opening to control the quantity of fuel of gases across the turbine.

9. The method as claimed in claim 1 wherein the power turbine drives a generator.

10. The method as claimed in claim 1 comprising the further step of providing a path for said products of combustion from a point downstream of the power turbine and turbocharger turbine to a point upstream of the intake of the turbocharger compressor.

11. The method as claimed in claim 10 comprising the further step of cooling the said products of combustion passing through said path.

12. An internal combustion power system comprised of:
an air breathing, fuel consuming, reciprocating compression ignition internal combustion engine operating at near stoichiometric fuel stroke/air conditions and producing products of combustion with an excess of energy to produce a power output;
a turbocharger having a turbine receiving said products of combustion from said reciprocating compression ignition engine and a compressor driven by said turbine for supplying pressurized air to said reciprocating compression ignition engine;
a power turbine connected in parallel with said turbocharger turbine to also receive said products of combustion from said reciprocating compression ignition engine, said power turbine connected to at least one of the power output of said reciprocating compression ignition engine and an auxiliary load device, and:
a valve operable to selectively permit passage of said products of combustion across said power turbine when a preselected level of one of boost pressure from said turbocharger compressor and back pressure of said products of combustion upstream of said turbocharger turbine is exceeded.

13. The internal combustion power system as claimed in claim 12 having a passage of said products of combustion connected between a point downstream of the power turbine and turbocharger turbine to the intake for said reciprocating compression ignition engine and further comprising a pump for circulating said products of combustion to the intake of said engine, said pump being driven by said power turbine.

14. The internal combustion power system as claimed in claim 13 wherein the passage of said products of combustion is cooled.

15. The internal combustion power system as claimed in claim 12 further comprising an intercooler disposed in series between said turbocharger compressor and the inlet to said reciprocating compression ignition engine.

16. The internal combustion power system as claimed in claim 12 further comprising an intake throttle upstream of the inlet to said reciprocating compression ignition engine.

17. The internal combustion power system as claimed in claim 12 further comprising a combustion product after treatment device positioned downstream of said power turbine and said turbocharger turbine.

18. The internal combustion power system as claimed in claim 17 wherein said combustion product aftertreatment comprises a diesel particulate filter in series connection with a 3-way catalyst.

19. The internal combustion power system as claimed in claim 17 further comprising the connection of said products of combustion from a point downstream of said combustion product aftertreatment device to a point upstream of the inlet to said turbocharger compressor.

20. The internal combustion power system has claimed in claim 19 further comprising a device for cooling the products of combustion recirculated to the inlet of said compressor.

21. The internal combustion power system has claimed in claim 12 wherein the valve is positioned downstream from said power turbine.

22. The internal combustion engine system as claimed in claim 12 wherein said power turbine is connected to a generator for providing power to the power output of said internal combustion engine.

23. A working machine comprising:
a frame;
a plurality of wheels mounted to said frame for the working machine moving over ground;
a transmission mounted to said frame and driving at least two of the plurality of wheels;
an air breathing, fuel consuming, reciprocating compression ignition internal combustion engine mounted to said frame and operating at near stoichiometric fuel/air conditions and producing products of combustion with an excess of energy and producing a power output at least connected to said transmission;
a turbocharger having a turbine receiving said products of combustion from said reciprocating compression ignition engine and a compressor driven by said turbine for supplying pressurized air to said reciprocating compression ignition engine;
a power turbine connected in parallel with said turbocharger turbine to also receive said products of combustion from said reciprocating compression ignition engine, said power turbine connected to at least one of the power output of said IC engine and an auxiliary load device, and;
a valve operable to selectively permit passage of said products of combustion across said power turbine when a preselected level of one of boost pressure from said turbocharger compressor and back pressure upstream of said turbocharger turbine is exceeded.

24. The work machine as claimed in claim 23 further comprising an passage of said products of combustion connected between a point downstream of said power turbine and turbocharger turbines to the intake manifold of said reciprocating compression ignition engine and a pump connected to and driven by said power turbine for directing through said path to the inlet of said reciprocating compression ignition engine.

25. The work machine as claimed in claim 24 further comprising a device for cooling the products of combustion in said passage to said engine intake.

26. The work machine as claimed in claim 23 further comprising an intercooler positioned between said turbocharger compressor and said reciprocating compression ignition engine intake.

27. The work machine as claimed in claim 23 further comprising a variable throttle position between said turbocharger compressor and the intake to said reciprocating compression ignition engine.

28. The work machine as claimed in claim 23 further comprising a combustion product aftertreatment device positioned downstream of said power turbine and said turbocharger turbine.

29. The work machine as claimed in claim 28 wherein said combustion product aftertreatment device comprises a diesel particulate filter in series relation to a three-way catalyst.

30. The work machine as claimed in claim 28 further comprising a path for said products of combustion from downstream of said combustion product aftertreatment device to a point upstream of the inlet of said turbocharger compressor.

31. The work machine as claimed in claim 30 further comprising a device for cooling the combustion product in the combustion product passage.

32. The work machine as claimed in claim 23 wherein said control valve is positioned downstream of said power turbine.

33. The work machine as claimed in claim 23 wherein said power turbine is connected to a generator.

\* \* \* \* \*

UNITED STATES PATENT AND TRADEMARK OFFICE
CERTIFICATE OF CORRECTION

| | | |
|---|---|---|
| PATENT NO. | : 8,474,258 B2 | Page 1 of 1 |
| APPLICATION NO. | : 12/236863 | |
| DATED | : July 2, 2013 | |
| INVENTOR(S) | : Budhadeb Mahakul et al. | |

It is certified that error appears in the above-identified patent and that said Letters Patent is hereby corrected as shown below:

In the Claims

COLUMN 4
Claim 2, line 67, insert -- reciprocating -- immediately before compression.

Signed and Sealed this
Twenty-second Day of October, 2013

Teresa Stanek Rea
*Deputy Director of the United States Patent and Trademark Office*